(12) United States Patent
Kannangara et al.

(10) Patent No.: US 11,333,021 B2
(45) Date of Patent: *May 17, 2022

(54) GAS TURBINE ENGINE HAVING FAN OUTLET GUIDE VANE ROOT POSITION TO FAN DIAMETER RATIO

(71) Applicant: ROLLS-ROYCE plc, London (GB)

(72) Inventors: Chathura K Kannangara, Derby (GB); Jillian C Gaskell, Derby (GB); Stewart T Thornton, Derby (GB); Timothy Philp, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/381,767

(22) Filed: Jul. 21, 2021

(65) Prior Publication Data

US 2022/0098984 A1    Mar. 31, 2022

Related U.S. Application Data

(63) Continuation of application No. 17/082,886, filed on Oct. 28, 2020, now Pat. No. 11,111,791, which is a (Continued)

(30) Foreign Application Priority Data

May 2, 2019    (GB) ...................... 1906164

(51) Int. Cl.
*F01D 5/14*    (2006.01)
*F02C 7/20*    (2006.01)
(Continued)

(52) U.S. Cl.
CPC ............. *F01D 5/14* (2013.01); *F01D 25/243* (2013.01); *F01D 25/28* (2013.01); *F02C 7/20* (2013.01);
(Continued)

(58) Field of Classification Search
CPC .. F02C 3/06; F02C 3/064; F02C 3/067; F02C 7/20; F02C 7/36; F02K 3/06; F01D 5/14; F01D 5/28; F01D 25/243; F01D 25/28
See application file for complete search history.

(56) References Cited

U.S. PATENT DOCUMENTS 2,770,946 A    11/1956  Savin
6,467,988 B1   10/2002  Czachor et al.
(Continued)

FOREIGN PATENT DOCUMENTS

EP    1158142 A2    11/2001
EP    2251540 A2    11/2010
(Continued)

OTHER PUBLICATIONS

Knip, "Analysis of an Advanced Technology Subsonic Turbofan Incorporating Revolutionary Materials", May 1987, NASA Technical Memorandum 89868, pp. 1-17 (Year: 1987).

*Primary Examiner* — Andrew H Nguyen
(74) *Attorney, Agent, or Firm* — Oliff PLC

(57) ABSTRACT

A gas turbine engine includes an engine core, a fan located upstream of the engine core, a nacelle surrounding the engine core and defining a bypass duct, and a fan outlet guide vane (OGV) extending radially across the bypass duct between an outer surface of the engine core and an inner surface of the nacelle. The engine core includes a compressor system, and an outer core casing surrounding the compressor system and including a first flange connection arranged to allow separation of the outer core casing at an axial position of the first flange connection. An axial midpoint of a radially inner edge of the fan OGV is defined as the fan OGV root centrepoint. A fan OGV root position to fan diameter ratio of:

(Continued)

$$\frac{\text{an axial distance between the first flange connection and the fan OGV root centrepoint}}{\text{the fan diameter}}$$

is equal to or less than 0.33.

20 Claims, 7 Drawing Sheets

Related U.S. Application Data continuation of application No. 16/778,617, filed on Jan. 31, 2020, now Pat. No. 10,858,942, which is a continuation of application No. 16/451,467, filed on Jun. 25, 2019, now Pat. No. 10,598,022.

(51) Int. Cl.
*F01D 25/28* (2006.01)
*F02C 7/36* (2006.01)
*F01D 25/24* (2006.01)
*F16H 1/28* (2006.01)
*F02K 3/06* (2006.01)

(52) U.S. Cl.
CPC .................. *F02C 7/36* (2013.01); *F02K 3/06* (2013.01); *F16H 1/28* (2013.01); *F05D 2220/32* (2013.01); *F05D 2240/14* (2013.01); *F05D 2240/24* (2013.01); *F05D 2240/90* (2013.01); *F05D 2260/31* (2013.01); *F05D 2260/40311* (2013.01)

(56) References Cited

U.S. PATENT DOCUMENTS

| | | |
|---|---|---|
| 8,794,912 B2 | 8/2014 | Nilsson et al. |
| 10,598,022 B1 | 3/2020 | Kannangara et al. |
| 10,858,942 B2 | 12/2020 | Kannangara et al. |
| 2002/0182064 A1 | 12/2002 | Schipani et al. |
| 2007/0241257 A1 | 10/2007 | Eleftheriou et al. |
| 2009/0155063 A1 | 6/2009 | Duchatelle et al. |
| 2010/0132373 A1 | 6/2010 | Durocher et al. |
| 2010/0254810 A1 | 10/2010 | Mulcaire |
| 2011/0070076 A1 | 3/2011 | Sheoran et al. |
| 2014/0286749 A1 | 9/2014 | Gehlot et al. |
| 2015/0176493 A1 | 6/2015 | Munsell et al. |
| 2015/0247424 A1 | 9/2015 | Schwarz et al. |
| 2015/0247461 A1 | 9/2015 | Schwarz et al. |
| 2016/0215729 A1 | 7/2016 | Sabnis |
| 2018/0362170 A1 | 12/2018 | Stuart et al. |
| 2019/0063368 A1 | 2/2019 | Phelps et al. |

FOREIGN PATENT DOCUMENTS

| | | |
|---|---|---|
| EP | 2256303 A2 | 12/2010 |
| EP | 3343002 A1 | 7/2018 |
| FR | 2889861 A1 | 2/2007 |
| FR | 2931906 A1 | 12/2009 |
| WO | 92/019854 A1 | 11/1992 |

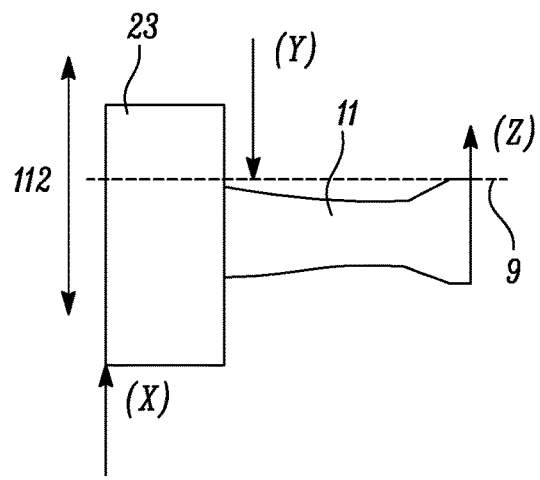
*FIG. 4A*
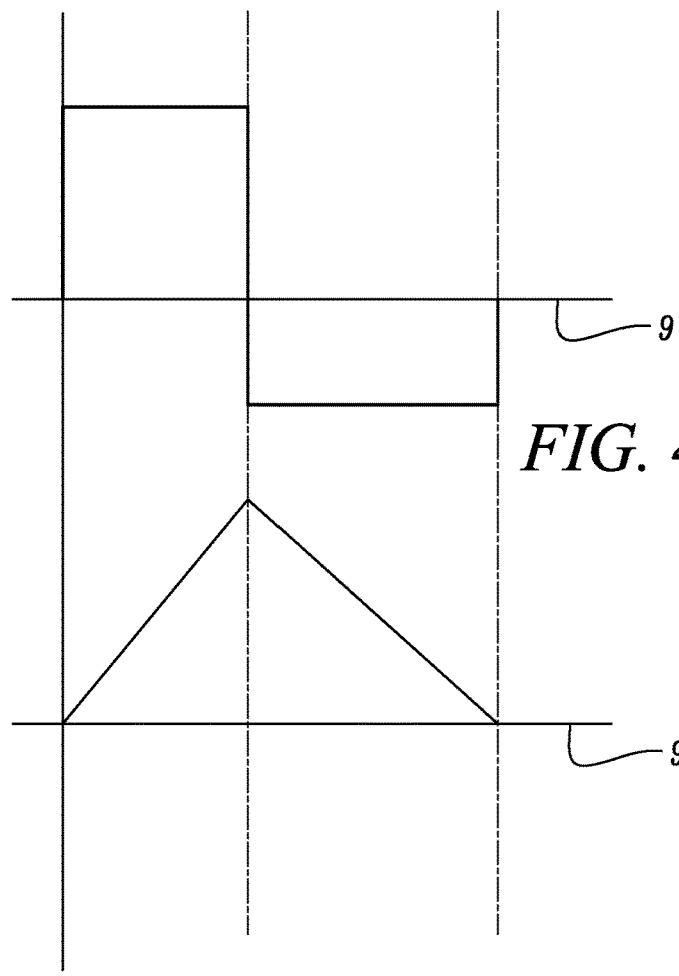
*FIG. 4B*
*FIG. 4C*

GAS TURBINE ENGINE HAVING FAN OUTLET GUIDE VANE ROOT POSITION TO FAN DIAMETER RATIO

This is a continuation of application Ser. No. 17/082,886 filed Oct. 28, 2020, which in turn is a continuation of application Ser. No. 16/778,617 filed Jan. 31, 2020, which in turn is a continuation of application Ser. No. 16/451,467 filed Jun. 25, 2019, which claims the benefit of GB 1906164.7 filed May 2, 2019. The disclosure of the prior applications is hereby incorporated by reference herein in its entirety.

BACKGROUND

The present disclosure relates to a gas turbine engine for an aircraft, and more specifically to a gas turbine engine with specified relative component positions.

The skilled person would appreciate that simply scaling up an engine may introduce problems such as increased stress, strain and/or bending moment on parts of the engine, and/or on a wing of the aircraft to which it is mounted. Reconsideration of engine parameters may therefore be appropriate.

For example, the skilled person would appreciate that, if the fan size of a gas turbine engine is increased, bending loads on the engine core may be deleteriously increased. A redesign of the engine core and/or of supporting components of the gas turbine engine may therefore be appropriate.

SUMMARY

According to a first aspect, there is provided a gas turbine engine for an aircraft comprising:
  an engine core comprising:
    a compressor system with compressor blades comprising respective aerofoils, the compressor system comprising a first, lower pressure, compressor, and a second, higher pressure, compressor; and
    an outer core casing surrounding the compressor system and comprising:
    a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor; and
  a fan located upstream of the engine core, the fan comprising a plurality of fan blades;
  wherein a fan blade mass ratio of:

$$\frac{\text{first flange radius}}{\text{mass of each fan blade}}$$

is equal to or less than 19.0 mm/lb.

The fan blade mass ratio may be equal to or greater than 5 mm/lb.

A blade set mass ratio of:

$$\frac{\text{first flange radius}}{\text{total mass of the plurality of fan blades}}$$

may be in the range between 0.95 mm/lb and 0.35 mm/lb.

Each of the fan blades may be at least partly formed from a metallic material. The metallic material may be titanium or aluminium lithium alloy.

Each of the fan blades may be formed at least partly from a composite material.

The fan diameter may be greater than 240 cm and less than or equal to 380 cm, and optionally may be greater than 300 cm and less than or equal to 380 cm.

The fan diameter may be between 330 cm and 380 cm, and optionally may be between 335 cm and 360 cm.

The number of fan blades may be between 16 and 22.

The mass of each fan blade may be in a range between 20 lb and 70 lb.

The gas turbine engine may further comprise a gearbox that receives an input from a core shaft and outputs drive to the fan so as to drive the fan at a lower rotational speed than the core shaft.

A gear ratio of the gearbox may be between 3.1 and 4.0.

The first flange may be at, or axially downstream of, a leading edge of the most upstream aerofoil of the second compressor. Alternatively, the first flange may be at, or axially upstream of, a leading edge of the most upstream aerofoil of the second compressor.

The gas turbine engine may further comprise: a first turbine, and a first core shaft connecting the first turbine to the first compressor; and a second turbine and a second core shaft connecting the second turbine to the second compressor. The second turbine, second compressor, and second core shaft may be arranged to rotate at a higher rotational speed than the first core shaft.

The engine core may further comprise an inner core casing provided radially inwardly of the compressor blades of the compressor system, the inner core casing and the outer core casing defining a core working gas flow path therebetween. A gas path radius may be defined as the outer radius of the core gas flow path at the axial position of the first flange, and a gas path ratio of:

$$\frac{\text{first flange radius}}{\text{gas path radius}}$$

may be equal to or greater than 1.10 and less than or equal to 2.0.

A fan diameter ratio of:

$$\frac{\text{first flange radius}}{\text{fan diameter}}$$

may be equal to or greater than 0.125 and less than or equal to 0.17.

The gas turbine engine may further comprise a front mount arranged to be connected to a pylon.

A front mount position ratio of:

$$\frac{\text{axial distance between the first flange connection and the front mount}}{\text{first flange radius}}$$

may be equal to or less than 1.18.

A front mount position to fan diameter ratio of:

$$\frac{\text{the axial distance between the first flange connection and the front mount}}{\text{the fan diameter}}$$

may be less than or equal to 0.145.

The front mount may be a core mount.

The gas turbine engine may further comprise: a nacelle surrounding the engine core and defining a bypass duct between the engine core and the nacelle; and a fan outlet guide vane (OGV) extending radially across the bypass duct between an outer surface of the engine core and the inner surface of the nacelle, the fan OGV having a radially inner edge and a radially outer edge, wherein an axial midpoint of the radially inner edge is defined as the fan OGV root centrepoint.

A fan OGV root position ratio of:

$$\frac{\text{axial distance between the first flange connection and the fan } OGV \text{ root centrepoint}}{\text{first flange radius}}$$

may be equal to or less than 2.6.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

A fan OGV tip position ratio of:

$$\frac{\text{axial distance between the first flange connection and the fan } OGV \text{ tip centrepoint}}{\text{first flange radius}}$$

may be equal to or less than 1.8.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

According to a further aspect, there is provided gas turbine engine for an aircraft comprising:

an engine core comprising:
 a compressor system with compressor blades comprising respective aerofoils, the compressor system comprising a first, lower pressure, compressor, and a second, higher pressure, compressor;
 an inner core casing provided radially inwardly of the compressor blades of the compressor system; and
 an outer core casing surrounding the compressor system, the inner core casing and the outer core casing defining a core working gas flow path therebetween, the outer core casing comprising:
  a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor; and
a fan located upstream of the engine core, the fan comprising a plurality of fan blades and having a fan diameter;
wherein a gas path radius is defined as the outer radius of the core gas flow path at the axial position of the first flange connection, and a gas path ratio of:

$$\frac{\text{first flange radius}}{\text{gas path radius}}$$

is equal to or greater than 1.10.

The gas path ratio may be equal to or greater than 1.50.

The gas path ratio may be less than or equal 2.0.

The outer core casing may comprise a first outer core casing and a second outer core casing, the first outer core casing being provided radially inwardly of the second outer core casing. The first flange connection may be provided on the second outer core casing. The gas path radius may be defined as the radius of a radially inner surface of the first outer core casing.

The fan diameter may be greater than 240 cm and less than or equal to 380 cm, and optionally may be greater than 300 cm and less than or equal to 380 cm.

The fan diameter may be between 330 cm and 380 cm, and optionally may be between 335 cm and 360 cm.

The number of fan blades may be between 16 and 22.

The engine may further comprise a gearbox that receives an input from a core shaft and outputs drive to the fan so as to drive the fan at a lower rotational speed than the core shaft.

A gear ratio of the gearbox may be between 3.1 and 4.0.

The first flange connection may be at, or axially downstream of, a leading edge of the most upstream aerofoil of the second compressor. Alternatively, the first flange connection may be at, or axially upstream of, a leading edge of the most upstream aerofoil of the second compressor.

The engine may comprise: a first turbine and a first core shaft connecting the first turbine to the first compressor; and a second turbine and a second core shaft connecting the second turbine to the second compressor. The second turbine, second compressor, and second core shaft may be arranged to rotate at a higher rotational speed than the first core shaft.

A fan diameter ratio of:

$$\frac{\text{first flange radius}}{\text{fan diameter}}$$

may be equal to or greater than 0.125 and less than or equal to 0.17.

A fan blade mass ratio of:

$$\frac{\text{first flange radius}}{\text{mass of each fan blade}}$$

may be equal to or less than 19.0 mm/lb.

A blade set mass ratio of:

$$\frac{\text{first flange radius}}{\text{total mass of the plurality of fan blades}}$$

may be in the range between 0.95 mm/lb and 0.35 mm/lb.

The gas turbine engine may further comprise a front mount arranged to be connected to a pylon.

A front mount position ratio of:

$$\frac{\text{axial distance between the first flange connection and the front mount}}{\text{first flange radius}}$$

may be equal to or less than 1.18.

A front mount position to fan diameter ratio of:

$$\frac{\text{the axial distance between the first flange connection and the front mount}}{\text{the fan diameter}}$$

may be less than or equal to 0.145.

The front mount may be a core mount.

The gas turbine engine may further comprise: a nacelle surrounding the engine core and defining a bypass duct between the engine core and the nacelle; and a fan outlet guide vane (OGV) extending radially across the bypass duct between an outer surface of the engine core and the inner surface of the nacelle, the fan OGV having a radially inner edge and a radially outer edge. An axial midpoint of the radially inner edge may be defined as the fan OGV root centrepoint.

A fan OGV root position ratio of:

$$\frac{\text{axial distance between the first flange connection and the fan } OGV \text{ root centrepoint}}{\text{first flange radius}}$$

may be equal to or less than 2.6.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

A fan OGV tip position ratio of:

$$\frac{\text{axial distance between the first flange connection and the fan } OGV \text{ tip centrepoint}}{\text{first flange radius}}$$

may be equal to or less than 1.8.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

According to a further aspect, there is provided a gas turbine engine for an aircraft comprising:
an engine core comprising:
a compressor system with compressor blades comprising respective aerofoils, the compressor system comprising a first, lower pressure, compressor, and a second, higher pressure, compressor; and
an outer core casing surrounding the compressor system and comprising:
a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor; and
a fan located upstream of the engine core, the fan comprising a plurality of fan blades and having a fan diameter;
wherein a fan diameter ratio of:

$$\frac{\text{first flange radius}}{\text{fan diameter}}$$

is equal to or greater than 0.125.

The fan diameter ratio may be less than or equal to 0.17.

The fan diameter may be greater than 240 cm and less than or equal to 380 cm, and optionally may be greater than 300 cm and less than or equal to 380 cm.

The fan diameter may be between 330 cm and 380 cm, and optionally may be between 335 cm and 360 cm.

The number of fan blades may be between 16 and 22.

The gas turbine engine may further comprise a gearbox that receives an input from a core shaft and outputs drive to the fan so as to drive the fan at a lower rotational speed than the core shaft.

A gear ratio of the gearbox may be between 3.1 and 4.0.

The first flange connection may be at, or axially downstream of, a leading edge of the most upstream aerofoil of the second compressor. Alternatively, the first flange connection may be at, or axially upstream of, a leading edge of the most upstream aerofoil of the second compressor.

The engine may further comprise: a first turbine, and a first core shaft connecting the first turbine to the first compressor; and a second turbine and a second core shaft connecting the second turbine to the second compressor. The second turbine, second compressor, and second core shaft may be arranged to rotate at a higher rotational speed than the first core shaft.

The engine core further comprises an inner core casing provided radially inwardly of the compressor blades of the compressor system, the inner core casing and the outer core casing defining a core working gas flow path therebetween. A gas path radius is defined as the outer radius of the core gas flow path at the axial position of the first flange connection. A gas path ratio of:

$$\frac{\text{first flange radius}}{\text{gas path radius}}$$

may be equal to or greater than 1.10 and less than or equal to 2.0.

A fan blade mass ratio of:

$$\frac{\text{first flange radius}}{\text{mass of each fan blade}}$$

may be equal to or less than 19.0 mm/lb.

A blade set mass ratio of:

$$\frac{\text{first flange radius}}{\text{total mass of the plurality of fan blades}}$$

may be in the range between 0.95 mm/lb and 0.35 mm/lb.

The gas turbine engine may further comprise a front mount arranged to be connected to a pylon.

A front mount position ratio of:

$$\frac{\text{axial distance between the first flange connection and the front mount}}{\text{first flange radius}}$$

may be equal to or less than 1.18.

A front mount position to fan diameter ratio of:

$$\frac{\text{the axial distance between the first flange connection and the front mount}}{\text{the fan diameter}}$$

may be less than or equal to 0.145.

The front mount may be a core mount.

The gas turbine engine may further comprise: a nacelle surrounding the engine core and defining a bypass duct between the engine core and the nacelle; and a fan outlet guide vane (OGV) extending radially across the bypass duct between an outer surface of the engine core and the inner surface of the nacelle, the fan OGV having a radially inner edge and a radially outer edge, wherein an axial midpoint of the radially inner edge is defined as the fan OGV root centrepoint.

A fan OGV root position ratio of:

$$\frac{\text{axial distance between the first flange connection and the fan } OGV \text{ root centrepoint}}{\text{first flange radius}}$$

may be equal to or less than 2.6.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

A fan OGV tip position ratio of:

$$\frac{\text{axial distance between the first flange connection and the fan } OGV \text{ tip centrepoint}}{\text{first flange radius}}$$

may be equal to or less than 1.8.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

According to a further aspect, there is provided a gas turbine engine for an aircraft comprising an engine core comprising a compressor system with compressor blades comprising respective aerofoils, the compressor system comprising a first, lower pressure, compressor, and a second, higher pressure, compressor, an outer core casing surrounding the compressor system. The gas turbine further comprises a fan located upstream of the engine core, the fan comprising a plurality of fan blades and having a fan diameter.

The outer core casing comprises a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor, and a front mount arranged to be connected to a pylon.

A front mount position ratio of:

$$\frac{\text{axial distance between the first flange connection and the front mount}}{\text{first flange radius}}$$

is equal to or less than 1.18.

The front mount position ratio may be greater than or equal to 0.65.

The front mount position ratio may be less than or equal to 1.10, and optionally less than or equal to 1.00.

The fan diameter may be greater than 240 cm and less than or equal to 380 cm, and optionally greater than or equal to 300 cm and less than or equal to 380 cm.

The fan diameter may be between 330 cm and 380 cm, and optionally between 335 cm and 360 cm.

The number of fan blades may be between 16 and 22.

The engine may further comprise a gearbox that receives an input from a core shaft and outputs drive to the fan so as to drive the fan at a lower rotational speed than the core shaft. A gear ratio of the gearbox may be between 3.1 and 4.0.

The first flange connection may be at, or may be axially downstream of, a leading edge of the most upstream aerofoil of the second compressor. Alternatively, the first flange connection may be axially upstream of a leading edge of the most upstream aerofoil of the second compressor.

The engine may comprise:
 a first turbine, and a first core shaft connecting the first turbine to the first compressor; and
 a second turbine and a second core shaft connecting the second turbine to the second compressor.

The second turbine, second compressor, and second core shaft may be arranged to rotate at a higher rotational speed than the first core shaft.

A front mount position to fan diameter ratio of:

$$\frac{\text{the axial distance between the first flange connection and the front mount}}{\text{the fan diameter}}$$

may be less than or equal to 0.145.

The front mount position to fan diameter ratio may be greater than or equal to 0.07.

The front mount may be a core mount.

The gas turbine engine may further comprise:
 a nacelle surrounding the engine core and defining a bypass duct between the engine core and the nacelle; and
 a fan outlet guide vane (OGV) extending radially across the bypass duct between an outer surface of the engine core and the inner surface of the nacelle, the fan OGV having a radially inner edge and a radially outer edge, wherein an axial midpoint of the radially inner edge is defined as the fan OGV root centrepoint.

A fan OGV root position ratio of:

$$\frac{\text{axial distance between the first flange connection and the fan } OGV \text{ root centrepoint}}{\text{first flange radius}}$$

may be equal to or less than 2.6.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

The gas turbine engine may further comprise:
 a nacelle surrounding the engine core and defining a bypass duct between the engine core and the nacelle; and
 a fan outlet guide vane (OGV) extending radially across the bypass duct between an outer surface of the engine core and the inner surface of the nacelle, the fan OGV having a radially inner edge and a radially outer edge, wherein an axial midpoint of the radially outer edge is defined as the fan OGV tip centrepoint.

A fan OGV tip position ratio of:

$$\frac{\text{axial distance between the first flange connection and the fan } OGV \text{ tip centrepoint}}{\text{first flange radius}}$$

may be equal to or less than 1.8.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

The engine core may further comprise an inner core casing provided radially inwardly of the compressor blades of the compressor system. The inner core casing and the outer core casing may define a core working gas flow path (A) therebetween. A gas path radius may be defined as the outer radius of the core gas flow path (A) at the axial position of the first flange connection. A gas path ratio of:

$$\frac{\text{first flange radius}}{\text{gas path radius}}$$

may be equal to or greater than 1.10 and less than or equal to 2.0.

A fan diameter ratio of:

$$\frac{\text{first flange radius}}{\text{fan diameter}}$$

may be equal to or greater than 0.125 and less than or equal to 0.17.

A fan blade mass ratio of:

$$\frac{\text{first flange radius}}{\text{mass of each fan blade}}$$

may be equal to or less than 19.0 mm/lb.

According to a further aspect, there is provided a gas turbine for an aircraft comprising an engine core comprising a compressor system with compressor blades comprising respective aerofoils, the compressor system comprising a first, lower pressure, compressor, and a second, higher pressure, compressor, an outer core casing surrounding the compressor system. The gas turbine further comprises a fan located upstream of the engine core, the fan comprising a plurality of fan blades and having a fan diameter.

The outer core casing comprises a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor, and a front mount arranged to be connected to a pylon.

A fan diameter ratio of:

$$\frac{\text{first flange radius}}{\text{fan diameter}}$$

is equal to or greater than 0.125 and less than or equal to 0.17.

Any of the features of the preceding aspect may apply in various embodiments.

According to a further aspect, there is provided a gas turbine engine for an aircraft comprising:
an engine core comprising:
  a compressor system with compressor blades comprising respective aerofoils, the compressor system comprising a first, lower pressure, compressor, and a second, higher pressure, compressor; and
  an outer core casing surrounding the compressor system and comprising a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor;
a fan located upstream of the engine core, the fan comprising a plurality of fan blades and having a fan diameter;
a nacelle surrounding the engine core and defining a bypass duct between the engine core and the nacelle; and
a fan outlet guide vane (OGV) extending radially across the bypass duct between an outer surface of the engine core and the inner surface of the nacelle, the fan OGV having a radially inner edge and a radially outer edge, wherein an axial midpoint of the radially inner edge is defined as the fan OGV root centrepoint.

A fan OGV root position ratio of:

$$\frac{\text{axial distance between the first flange connection and the fan } OGV \text{ root centrepoint}}{\text{first flange radius}}$$

is equal to or less than 2.6.

The fan OGV root position ratio may be greater than or equal to 0.8.

The fan OGV root position ratio may be less than or equal to 2.00, and optionally less than or equal to 1.10.

The fan diameter may be greater than 240 cm and less than or equal to 380 cm, and optionally greater than or equal to 300 cm and less than or equal to 380 cm.

The fan diameter may be between 330 cm and 380 cm, and optionally between 335 cm and 360 cm.

The number of fan blades may be between 16 and 22.

The gas turbine engine may further comprise a gearbox that receives an input from a core shaft and outputs drive to the fan so as to drive the fan at a lower rotational speed than the core shaft. A gear ratio of the gearbox may be between 3.1 and 4.0.

The first flange connection may be at, or axially downstream of, a leading edge of the most upstream aerofoil of the second compressor.

The first flange connection may be at, or axially upstream of, a leading edge of the most upstream aerofoil of the second compressor.

The gas turbine engine may comprise:
  a first turbine, and a first core shaft connecting the first turbine to the first compressor; and
  a second turbine and a second core shaft connecting the second turbine to the second compressor.

The second turbine, second compressor, and second core shaft may be arranged to rotate at a higher rotational speed than the first core shaft.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

The fan OGV root position to fan diameter ratio may be greater than or equal to 0.12.

An axial midpoint of the radially outer edge may be defined as the fan OGV tip centrepoint. A fan OGV tip position ratio of:

$$\frac{\text{axial distance between the first flange connection and the fan } OGV \text{ tip centrepoint}}{\text{first flange radius}}$$

may be equal to or less than 1.8.

The fan OGV tip position ratio may be greater than or equal to 0.6.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

The gas turbine engine may further comprise a front mount arranged to be connected to a pylon. A front mount position ratio of:

$$\frac{\text{axial distance between the first flange connection and the front mount}}{\text{first flange radius}}$$

may be equal to or less than 1.18.

A front mount position to fan diameter ratio of:

$$\frac{\text{the axial distance between the first flange connection and the front mount}}{\text{the fan diameter}}$$

may be less than or equal to 0.145.

The engine core may further comprise an inner core casing provided radially inwardly of the compressor blades of the compressor system. The inner core casing and the outer core casing may define a core working gas flow path therebetween. A gas path radius may be defined as the outer radius of the core gas flow path at the axial position of the first flange connection. A gas path ratio of:

$$\frac{\text{first flange radius}}{\text{gas path radius}}$$

may be equal to or greater than 1.10 and less than or equal to 2.0.

A fan diameter ratio of:

$$\frac{\text{first flange radius}}{\text{fan diameter}}$$

may be equal to or greater than 0.125 and less than or equal to 0.17.

A fan blade mass ratio of:

$$\frac{\text{first flange radius}}{\text{mass of each fan blade}}$$

may be equal to or less than 19.0 mm/lb.

According to a further aspect, there is provided a gas turbine engine for an aircraft comprising:
 an engine core comprising:
  a compressor system with compressor blades comprising respective aerofoils, the compressor system comprising a first, lower pressure, compressor, and a second, higher pressure, compressor; and
  an outer core casing surrounding the compressor system and comprising a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor;
 a fan located upstream of the engine core, the fan comprising a plurality of fan blades and having a fan diameter;
 a nacelle surrounding the engine core and defining a bypass duct between the engine core and the nacelle; and
 a fan outlet guide vane (OGV) extending radially across the bypass duct between an outer surface of the engine core and the inner surface of the nacelle, the fan OGV having a radially inner edge and a radially outer edge, wherein an axial midpoint of the radially inner edge is defined as the fan OGV root centrepoint.

A fan diameter ratio of:

$$\frac{\text{first flange radius}}{\text{fan diameter}}$$

is equal to or greater than 0.125 and less than or equal to 0.17.

Any of the features of the preceding aspect may apply in various embodiments.

According to a further aspect, there is provided a gas turbine engine for an aircraft comprising:
 an engine core comprising:
  a compressor system with compressor blades comprising respective aerofoils, the compressor system comprising a first, lower pressure, compressor, and a second, higher pressure, compressor; and
  an outer core casing surrounding the compressor system and comprising a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor;
 a fan located upstream of the engine core, the fan comprising a plurality of fan blades and having a fan diameter;
 a nacelle surrounding the engine core and defining a bypass duct between the engine core and the nacelle; and
 a fan outlet guide vane (OGV) extending radially across the bypass duct between an outer surface of the engine core and the inner surface of the nacelle, the fan OGV having a radially inner edge and a radially outer edge, wherein an axial midpoint of the radially outer edge is defined as the fan OGV tip centrepoint.

A fan OGV tip position ratio of:

$$\frac{\text{axial distance between the first flange connection and the fan } OGV \text{ tip centrepoint}}{\text{first flange radius}}$$

is equal to or less than 1.8.

The fan OGV tip position ratio may be greater than or equal to 0.6.

The fan OGV root position ratio may be less than or equal to 1.20, and optionally less than or equal to 1.00.

The fan diameter may be greater than 240 cm and less than or equal to 380 cm, and optionally greater than 300 cm and less than or equal to 380 cm.

The fan diameter may be between 330 cm and 380 cm, and optionally between 335 cm and 360 cm.

The number of fan blades may be between 16 and 22.

The engine may further comprise a gearbox that receives an input from a core shaft and outputs drive to the fan so as to drive the fan at a lower rotational speed than the core shaft. A gear ratio of the gearbox may be between 3.1 and 4.0.

The first flange connection may be at, or axially downstream of, a leading edge of the most upstream aerofoil of the second compressor.

The first flange connection may be at, or axially upstream of, a leading edge of the most upstream aerofoil of the second compressor.

The engine may comprise:
a first turbine, and a first core shaft connecting the first turbine to the first compressor; and
a second turbine and a second core shaft connecting the second turbine to the second compressor.

The second turbine, second compressor, and second core shaft may be arranged to rotate at a higher rotational speed than the first core shaft.

A fan OGV tip position to fan diameter ratio of:

$$\frac{\text{the axial distance between the first flange connection and the fan } OGV \text{ tip centrepoint}}{\text{the fan diameter}}$$

may be less than or equal to 0.22.

The fan OGV tip position to fan diameter ratio may be greater than or equal to 0.095.

An axial midpoint of the radially inner edge may be defined as the fan OGV root centrepoint. A fan OGV root position ratio of:

$$\frac{\text{axial distance between the first flange connection and the fan } OGV \text{ root centrepoint}}{\text{first flange radius}}$$

may be equal to or less than 2.6.

The fan OGV root position ratio may be greater than or equal to 0.8.

A fan OGV root position to fan diameter ratio of:

$$\frac{\text{the axial distance between the first flange connection and the fan } OGV \text{ root centrepoint}}{\text{the fan diameter}}$$

may be less than or equal to 0.33.

The gas turbine engine may further comprise a front mount arranged to be connected to a pylon. A front mount position ratio of:

$$\frac{\text{axial distance between the first flange connection and the front mount}}{\text{first flange radius}}$$

may be equal to or less than 1.18.

A front mount position to fan diameter ratio of:

$$\frac{\text{the axial distance between the first flange connection and the front mount}}{\text{the fan diameter}}$$

may be less than or equal to 0.145.

The engine core may further comprise an inner core casing provided radially inwardly of the compressor blades of the compressor system. The inner core casing and the outer core casing may define a core working gas flow path therebetween. A gas path radius may be defined as the outer radius of the core gas flow path at the axial position of the first flange connection, and a gas path ratio of:

$$\frac{\text{first flange radius}}{\text{gas path radius}}$$

may be equal to or greater than 1.10 and less than or equal to 2.0.

A fan diameter ratio of:

$$\frac{\text{first flange radius}}{\text{fan diameter}}$$

may be equal to or greater than 0.125 and less than or equal to 0.17.

A fan blade mass ratio of:

$$\frac{\text{first flange radius}}{\text{mass of each fan blade}}$$

may be equal to or less than 19.0 mm/lb.

According to a further aspect, there is provided a gas turbine engine for an aircraft comprising:
an engine core comprising:
a compressor system with compressor blades comprising respective aerofoils, the compressor system comprising a first, lower pressure, compressor, and a second, higher pressure, compressor; and
an outer core casing surrounding the compressor system and comprising a first flange connection arranged to allow separation of the outer core casing at an axial position of the first flange connection, the first flange connection having a first flange radius, wherein the first flange connection is the first flange connection that is downstream of an axial position defined by the axial midpoint between the mid-span axial location on the trailing edge of the most downstream aerofoil of the first compressor and the mid-span axial location on the leading edge of the most upstream aerofoil of the second compressor;
a fan located upstream of the engine core, the fan comprising a plurality of fan blades and having a fan diameter;
a nacelle surrounding the engine core and defining a bypass duct between the engine core and the nacelle; and
a fan outlet guide vane (OGV) extending radially across the bypass duct between an outer surface of the engine core and the inner surface of the nacelle, the fan OGV having a radially inner edge and a radially outer edge, wherein an axial midpoint of the radially outer edge is defined as the fan OGV tip centrepoint.

A fan diameter ratio of:

$$\frac{\text{first flange radius}}{\text{fan diameter}}$$

is equal to or greater than 0.125 and less than or equal to 0.17.

Any of the features of the preceding aspect may apply in various embodiments.

The skilled person would appreciate that larger engines may present several structural challenges; one of which may be managing the bending stiffness at the engine core to react the increased bending loads arising from the larger fan diameter. The increased bending load may be exacerbated by fan outlet guide vanes moving rearward as compared to prior engine designs (due to other design constraints or preferences), so making the core bending more significant as the engine gets larger. The changes in relative component positions as detailed in the various aspects above may help to increase engine core stiffness, and/or improve the ability of the engine core to react the increased bending loads without deforming.

The skilled person would appreciate that these structural challenges may be particularly relevant to a medium to large gas turbine engine (larger than 240 cm (95")—medium—or larger than 300 cm (120")—large—fan diameter) having a reduction gearbox between its fan and its low pressure turbine.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core further comprises a second compressor. The first compressor and a second compressor may together be described as forming a compressor system. The first compressor may be a lower pressure compressor that the second compressor. The engine core may further comprise a second turbine, and a second core shaft connecting the second turbine to the second compressor. The second turbine, second compressor, and second core shaft may be arranged to rotate at a higher rotational speed than the first core shaft.

The second compressor may be positioned axially downstream of the first compressor. The second compressor may be arranged to receive (for example directly receive, for example via a generally annular duct) flow from the first compressor.

In embodiments with a gearbox, the gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressors. For example, the combustor may be directly downstream of (for example at the exit of) the second compressor. By way of further example, the flow at the exit to the combustor may be provided to the inlet of the second turbine, where a second turbine is provided. The combustor may be provided upstream of the turbine(s).

Each compressor (for example the first compressor and second compressor as described above—more compressors may be present in other embodiments) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm. The fan diameter may be greater than 240 cm—an engine comprising a fan with such a diameter may be classed as a medium or large engine. The fan diameter may be greater than 300 cm—an engine comprising a fan with such a diameter may be classed as a large engine. For example, the fan diameter of a large engine may be between 330 cm and 380 cm, and optionally between 335 cm and 360 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm, or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following:

1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. The number of fan blades may be between 16 and 22.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 4A shows a schematic view of an engine;

FIG. 4B shows a shear force diagram corresponding to FIG. 4A;

FIG. 4C shows a bending moment diagram corresponding to FIG. 4A;

DETAILED DESCRIPTION

Figure 1:
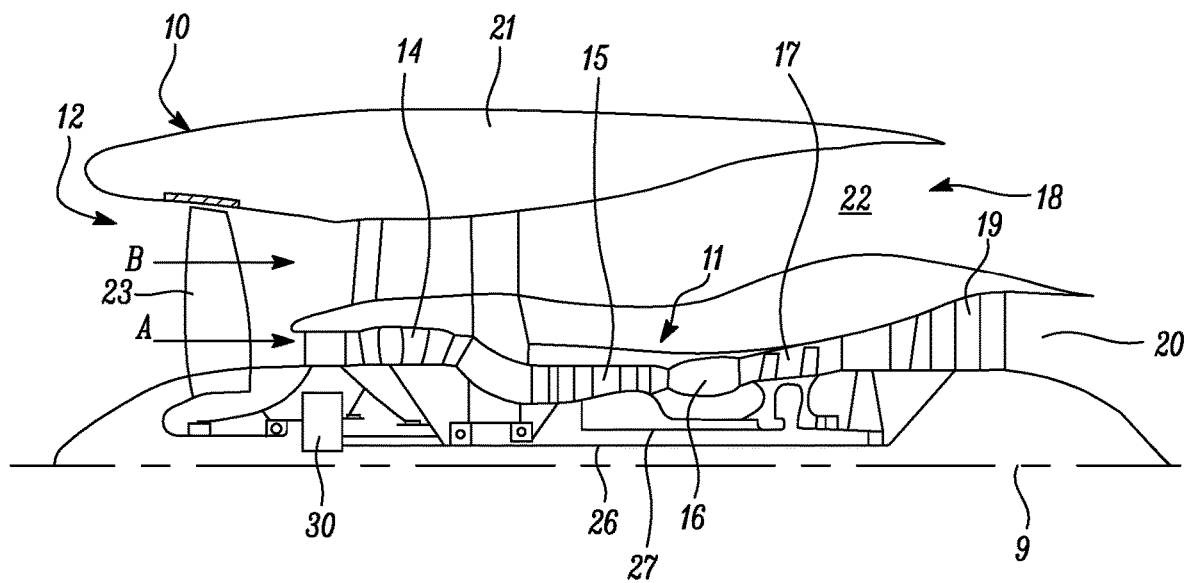
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
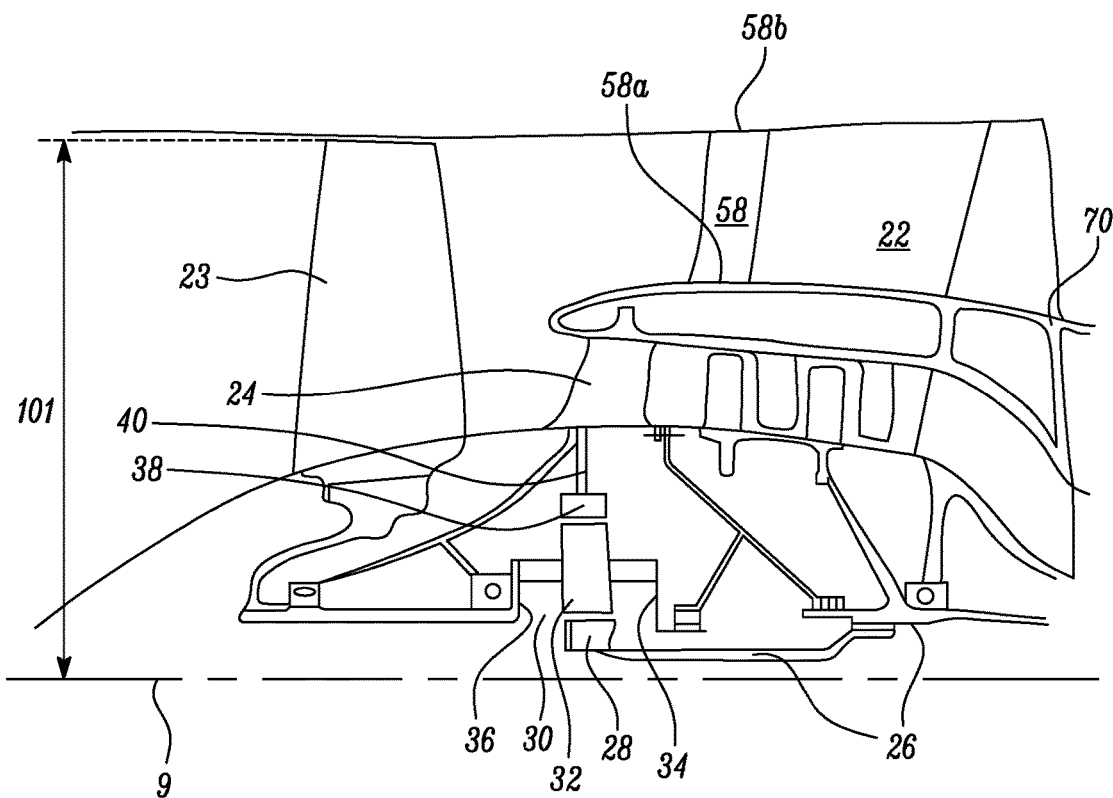
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3A:
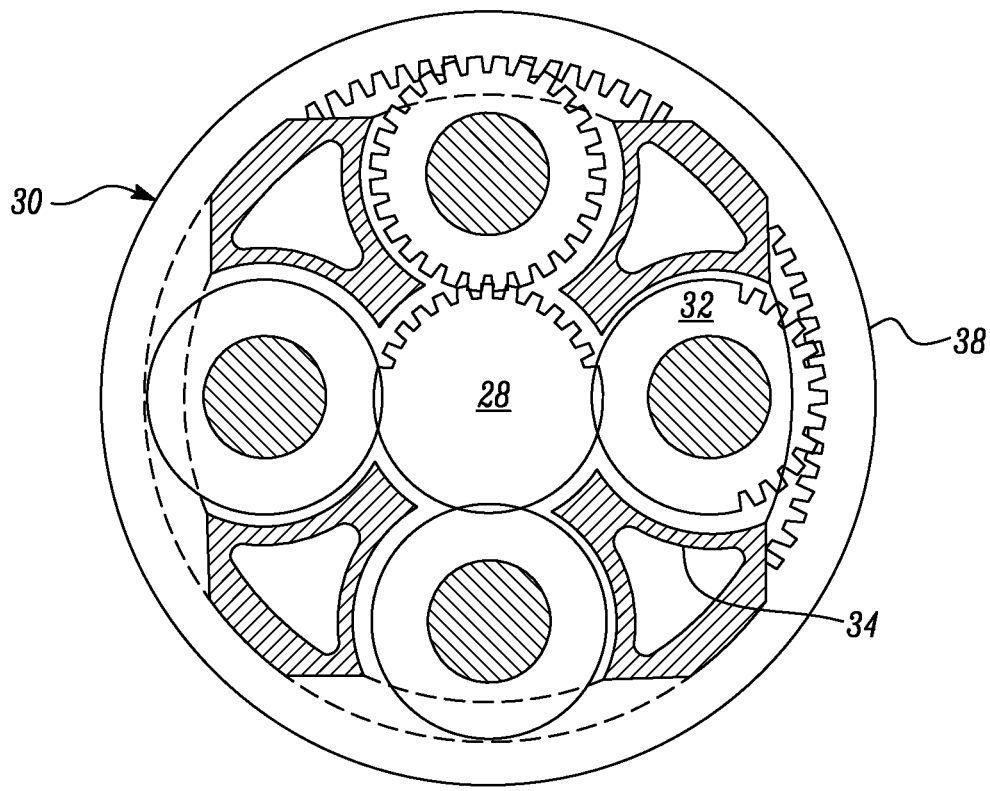
FIG. 3A is a partially cut-away view of a gearbox for a gas turbine engine.

The epicyclic gearbox 30 is shown by way of example in greater detail in FIG. 3A. Each of the sun gear 28, planet gears 32 and ring gear 38 comprise teeth about their periphery to intermesh with the other gears. However, for clarity only exemplary portions of the teeth are illustrated in FIG. 3A. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The engine 10 can be subject to bending due to both static and dynamic loading conditions. A simplified engine bending scenario is show in FIGS. 4A, 4B and 4C. In the embodiment being described, the engine 10 is a medium-large, geared gas turbine engine 10, having a fan diameter 112 greater than 240 cm, and more particularly greater than 300 cm. The engine 10 of the embodiment being described may therefore be described as a large engine, for example having a fan diameter 112 between 330 cm and 380 cm, and optionally between 335 cm and 360 cm, a gear ratio between 3.1 and 4.0, and a number of fan blades between 16 and 22.

A schematic side view of the gas turbine engine 10 is shown in FIG. 4A, with the rotational axis 9 extending horizontally. FIG. 4B shows a diagram of shear force with distance along the rotational axis 9, aligned with the schematic engine view of FIG. 4A. FIG. 4C shows a diagram of bending moment with distance along the rotational axis, aligned with the schematic engine view of FIG. 4A.

Arrow X in FIG. 4A indicates intake upload on the fan 23. The skilled person would appreciate that take-off is generally the most severe condition where the intake upload is a maximum.

Figure 9:
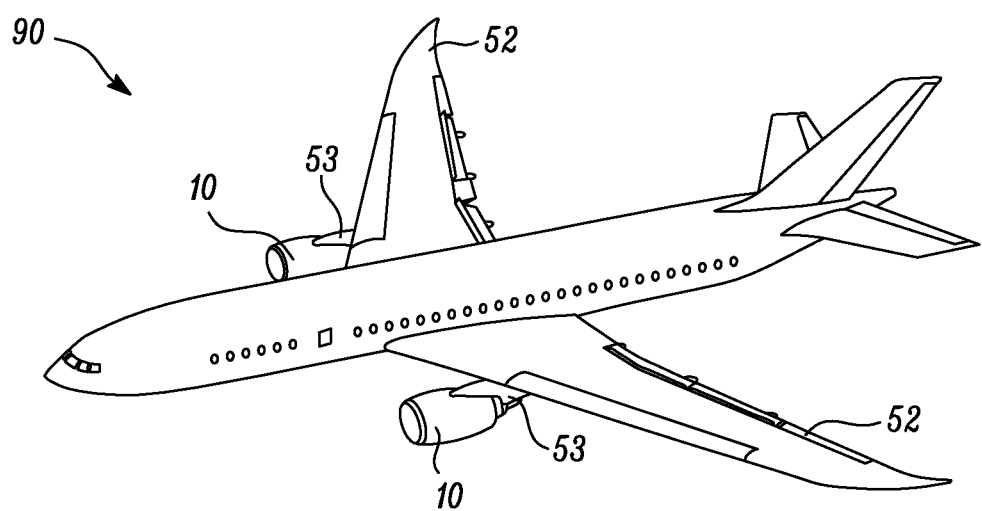
FIG. 9 shows an aircraft with two engines mounted thereon.
Figure 10:
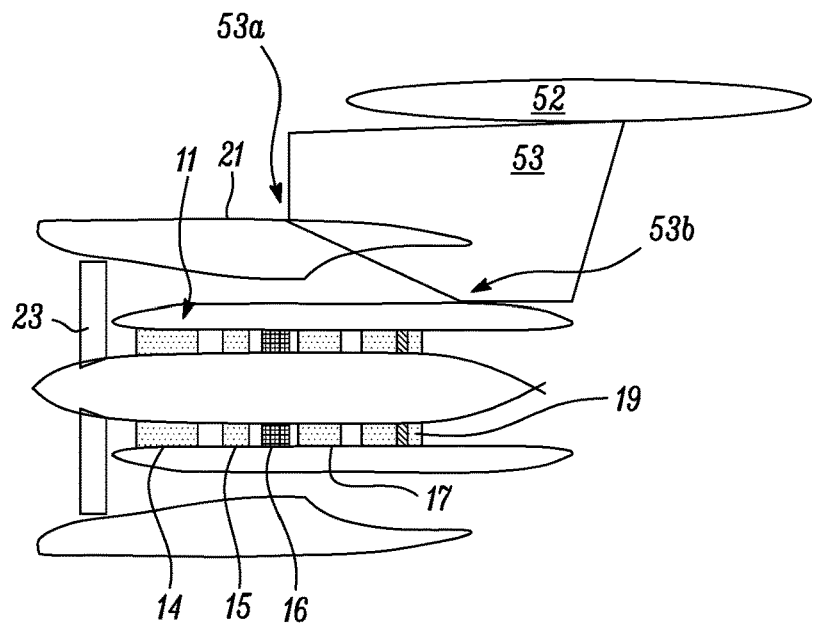
FIG. 10 is a schematic sectional side view of the mounting of an engine to a wing of the aircraft.

Arrow Y in FIG. 4A indicates reaction load at the front mount 50 due to intake upload. The skilled person would appreciate that gas turbine engines 10 are generally mounted to the wing 52 of an aircraft 90 by one or more pylons 53, as illustrated in FIGS. 9 and 10. The pylons 53 may be secured to the engine core 11, to the nacelle 21, or to both. The or each pylon 53 may be secured to the engine 10 at multiple points—multiple mounts may therefore be provided for the pylon(s). The front mount 50 is the forward-most mount on the engine 10, and may be located on the core 11 or on the nacelle 21 in various embodiments. The rear mount is the rear-most mount on the engine 10, and may be located on the core 11 or on the nacelle 21 in various embodiments. In FIG. 4A, the front and rear mount are both indicated to be on the engine core 11—one or both may instead be on the nacelle 21 in other embodiments.

Arrow Z in FIG. 4A indicates reaction load at the rear mount. In FIG. 4A, the front and rear mounts are both indicated to be on the core 11. In alternative embodiments, such as that shown in FIG. 10, the front mount 53a may be on the nacelle 21, and the rear mount 53b may be on the core 11. In such embodiments, multiple mounts may be present on the core 11—the mount 53b may be referred to as the front core mount as it is the forward-most (or only) mount present on the core 11.

The engine core 11 is therefore designed to react the bending moment with sufficient resistance to reduce or minimise performance losses due to casing deformations. The skilled person would appreciate that increased deformations leads to increased tolerances being needed, such as an increased blade tip to casing gap, so potentially resulting in decreased efficiency. Additionally or alternatively, casing deformations may result in increased wear on bearings, joints and the like, so potentially reducing engine lifespan.

The skilled person would appreciate that the structural load path of a gas turbine engine 10 generally comprises bearing structures, which are relatively high in stiffness, and rotor/combustor casings, which are relatively weaker. Flanges that join bearing structures to casings, and/or casing portions to other casing portions, are therefore likely to be areas where significant changes in stiffness occur. Regions containing one or more flanges may therefore be regions where the slope (dw/dl—delta deformation over delta length) tends to be severe.

The casing surrounding the core 11 is arranged to be separated at one or more positions along its length. A flange connection may be provided to allow separation of the casing into different portions. The positioning of such a flange connection may be constrained by flange integrity considerations. In design studies it has been observed that engine stiffness can be improved by moving a flange connection provided to connect portions of the casing (referred to as the first flange connection 60 in the embodiments described herein) further from the engine axis 9—i.e. to a higher diameter relative to the gas path.

Figure 5:
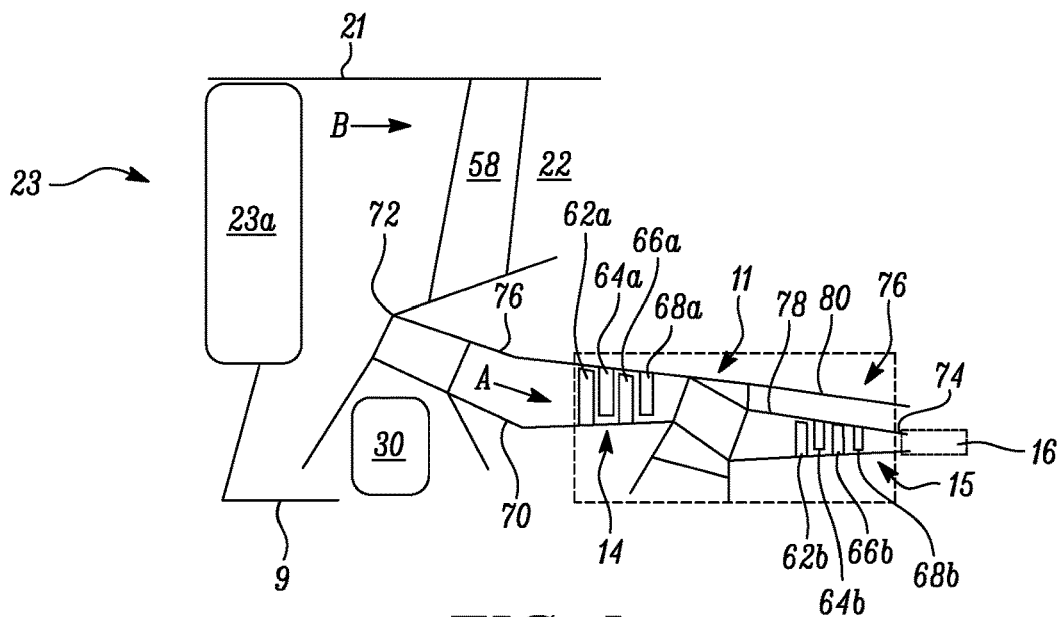
FIG. 5 is a close up sectional side view of an upstream portion of a gas turbine engine with an intercase portion highlighted.

Referring to FIG. 5, the low pressure compressor 14 and the high pressure compressor 15 together form a compressor system. The compressor system is shown in FIG. 5, and in the close up views of FIGS. 6A and 6B.

Each compressor 14, 15 of the compressor system comprises a respective axial compressor having one or more compressor stages, in the embodiments being described. In alternative embodiments, one or more centrifugal compressors may be used. In the embodiments being described, each compressor stage comprises a rotor and a stator. In the described embodiment, each of the high pressure compressor 15 and the lower pressure compressor 14 comprise two stages formed by a respective first rotor 62a, 62b, first stator 64a, 64b, second rotor 66a, 66b and second stator 68a, 68b. Each of the rotors provided in the compressors 14, 15 are formed from an annular array of rotor blades arranged to rotate in order to provide compression of airflow through the engine 10. Each of the stators comprises an annular array of stator blades that are stationary. The rotor blades and stator blades can each be described as aerofoils provided in the compressors 14, 15.

In the described embodiment two stages are provided in each compressor 14, 15. In other embodiments, any other suitable number of stages may be provided such as a single stage or three or more stages. The number of stages in each compressor may be the same, as illustrated, or different from each other.

The engine core 11 further comprises a radially inner core casing 70, which is provided radially outwardly of the interconnecting shafts 26, 27 connecting the low and high pressure compressors 14, 15 to the respective low and high pressure turbines 17, 19. The inner core casing 70 is provided radially inwardly of the blades of the compressors 14, 15. The inner core casing 70 extends in a generally axial direction between an inlet 72 downstream of the fan 23 and upstream of the low pressure compressor 15 to an outlet 74 downstream of the high pressure compressor 15 and upstream of the combustion equipment 16.

The engine core 11 further comprises an outer core casing 76 that generally surrounds the compressor system. The outer core casing 76 is provided radially outwardly of the inner core casing 70 and the tips of the stators and rotors provided in the compressors 14, 15. The core airflow path A is defined between a radially outer surface of the inner core casing 70 and a radially inner surface of the outer core casing 76. The engine outer core casing 76 extends between the inlet 72 and the outlet 74 similarly to the inner core casing 70.

The outer core casing 76 comprises a single wall in a forward region of the engine 10, and a first outer core casing 78 and a second outer core casing 80 in a rearward region of the engine 10, in the embodiment being described. As can be seen in FIG. 5 and the close up view of FIG. 6A, the outer core casing 76 bifurcates into the first and second outer core casings 78, 80 at a point along its axial length downstream (rearward) of the low pressure compressor 14 and upstream (forward) of the high pressure compressor 15. The first and second outer core casings 78, 80 are spaced apart by a gap extending along the axis 9. In the described embodiment, therefore, only part of the axial length of the outer core casing 76 is formed from the first and second outer core casings 78, 80. In other embodiments, separate first and second outer core casings 78, 80 could also extend across the low pressure compressor 14, and optionally across the full length of the outer core casing 76, or a single wall outer core casing 76 may extend the full length.

The first outer core casing 78 is provided radially inwardly of the second outer core casing 80. The inner surface of the first outer core casing 78 forms the inner surface of the outer core casing 76 which contains gas flow within the core airflow A. The first and second outer core casings 78, 80 each provide a separate function within the engine 10. The first outer core casing 78 is adapted to contain the core airflow A. It may therefore be wholly annular and is generally airtight (save for access for bleed ports or the like). The second outer core casing 80 is instead adapted to provide structural support (i.e. it may provide only structural support). It may not therefore need to be wholly annular or airtight. In other embodiments, both pressure containment and structural support may be provided by both the first and second core casings 78, 80.

The first outer core casing 78 extends radially inwardly in a downstream direction towards the engine centreline 9 in a part of the core 11 between the low pressure compressor 14 and the high pressure compressor 15 (e.g. in a diffuser section between the compressors 14, 15). The second outer core casing 80 on the other hand is relatively straight, and extends radially inwardly in a downstream direction to a lesser extent than the first core casing 78. As can be seen in the close up of FIG. 6A, downstream of the point at which the outer core wall 76 splits into the first and second outer core casings 78, 80, the first outer core casing extends radially inwardly in a downstream direction to a greater extent (i.e. at a steeper angle towards the engine centreline) than the second outer core casing 80. This results in an annular inter-casing gap 82 being defined by a radially outer surface of the first outer core casing 78 and a radially inner surface of the second outer core casing 80. In the embodiment being described, this arrangement of the first and second outer core casings 78, 80 may therefore provide narrowing of the core airflow path A without narrowing the outer surface of the outer core casing 76 to the same extent.

Figure 6A:
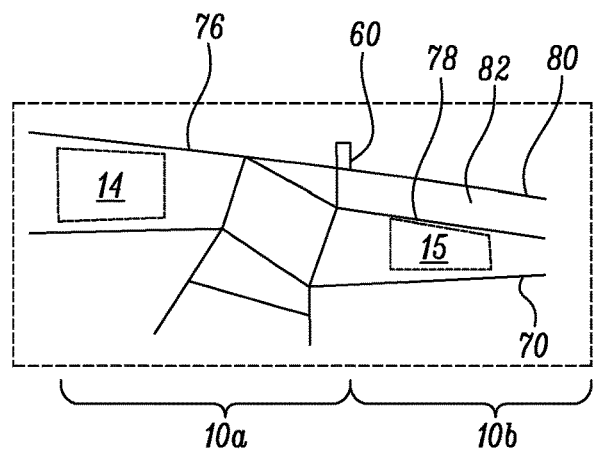
FIG. 6A is a close up sectional side view of an intercase portion.
Figure 6B:
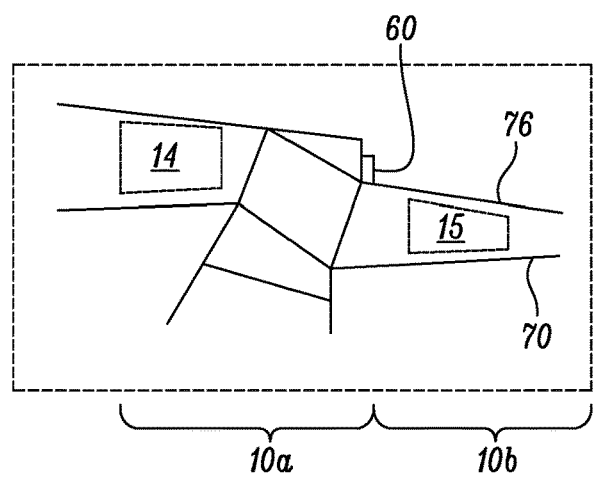
FIG. 6B is a close up sectional side view of a different intercase portion.

In an alternative embodiment, as illustrated in FIG. 6B, the outer core casing 76 does not bifurcate such that first outer core casing 78 and second outer core casing 80 are not present. In this embodiment, the compressors 14, 15 are surrounded by a single casing formed by the outer core casing 76. In such embodiments, the single wall 76 may increase in width and/or change shape at a point along its axial length upstream of the low pressure compressor 14 and downstream of the high pressure compressor 15.

First Flange Connection

Figure 3B:
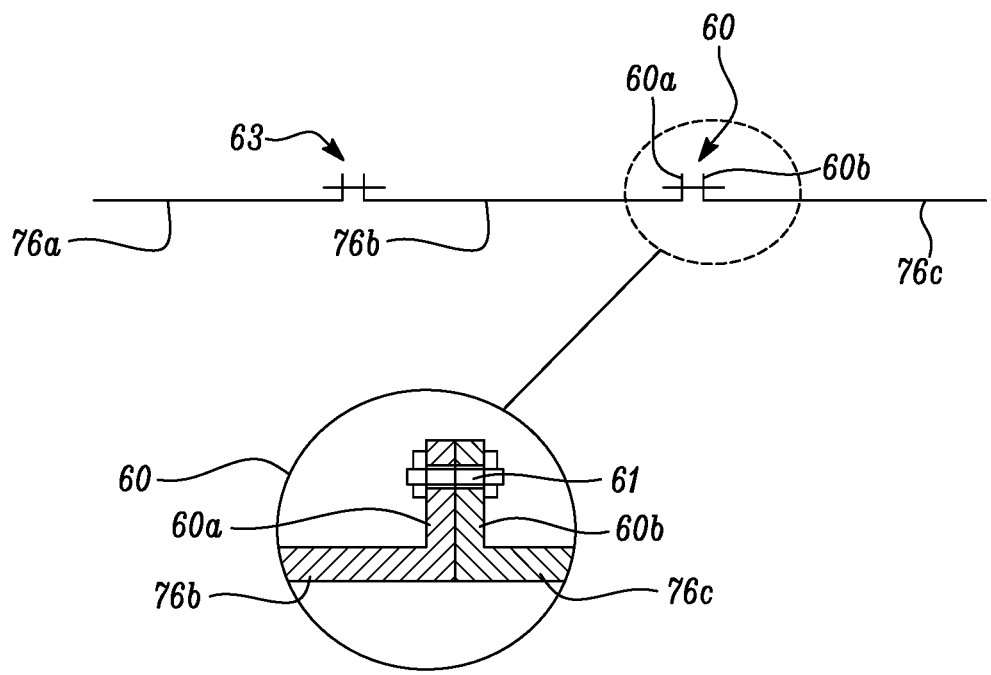
FIG. 3B shows a schematic view of flange connections of a gas turbine engine.

The first flange connection 60 forms a connection at one end region of the "intercase" 76b of the engine 10—i.e. a part of the outer core casing 76 between the casing 76a of the low pressure compressor 14 and the casing 76c of the high pressure compressor 15, as illustrated in FIG. 3B.

In the embodiment being described, the first flange connection 60 comprises two flanges 60a, 60b that extend radially outward from adjacent portions of the outer core casing 76, and which extend circumferentially around the casing 76. The two flanges of the first flange connection 60 extend radially outward from the second outer core casing 80 in the embodiment shown in FIG. 6A, and radially outward from the single wall outer casing 76 in the embodiment shown in FIG. 6B. In alternative embodiments, the first flange connection 60 may comprise a single flange arranged to be connected to a connection block, hollow portion of the casing 76 or the likes, instead of to a second flange. The first flange connection 60 may therefore comprise one or more flanges.

The intercase 76b may be arranged to be removable or detachable so as to allow access to the first and second compressors 14, 15.

The first flange connection 60 is arranged to allow separation of the outer core casing 76 at the axial position of the first flange 60 connection, for example to facilitate access for servicing and maintenance—the first flange connection 60 therefore defines a separation point of the engine 10. Two portions 10a, 10b of the casing 76 of the engine 10 may be separated by disconnection of the first flange 60 connection (where portion 10a may correspond to the low pressure compressor casing 76a and the intercase 76b, and portion 10b to the high pressure compressor casing 76c, in the examples shown in FIGS. 3B and 6B).

The first flange connection 60 comprises a two-part connection formed by a flange 60a and a respective connection structure 60b (i.e. another flange, bulkhead, or other structure) to which the flange 60a is connected. In the embodiment being described, the flange 60a of the first flange connection 60 is a flange extending from the intercase 76b, and the connection structure 60b is a flange extending from the casing 76c of the high pressure compressor 15. In the embodiment being described, the flange 60a of the first flange connection 60 is the rearmost flange of the intercase 76b; in alternative embodiments, a or the flange forming a part of the first flange connection 60 may be integral with the intercase 76 but not the rearmost flange of the intercase, may be integral with the casing 76a of the low pressure compressor (e.g. being the most downstream flange of the low pressure compressor casing 76a), or may be integral with the casing 76c of the high pressure compressor (e.g. being the most upstream flange of the high pressure compressor casing 76c).

The axial position of the first flange connection 60 is defined as the axial position of the contact surface of the one or more flanges 60a, 60b from which it is formed. The axial position therefore corresponds to the axial position of the separation point formed by the first flange connection 60.

For example, in one embodiment, the first flange connection 60 is formed by a pair of cooperating flanges 60a, 60b via which the two portions 10a, 10b are connected. An example of this is shown in FIGS. 3B and 6A and described in more detail later. In this embodiment, the axial position of the first flange connection 60 is defined as the axial position of the contact surface at which one of the pair of flanges is connected to, and in contact with, the other.

In other embodiments, the first flange connection 60 comprises a single flange 60a that is connected to another structure such as a bulkhead, box-portion or similar structure. An example of this is shown in FIG. 6B and described in more detail later. In this embodiment, the axial position of the first flange connection 60 is defined as the axial position of the contact surface of the single flange 60a from which the first flange connection 60 is formed.

In the embodiment being described, the first flange 60a of the first flange connection 60 forms part of a first engine casing portion 10a, and is connected to a second engine casing portion 10b by a flange connector 61.

The two parts 60a,b of the first flange connection 60 are connected by a flange connector 61. In the embodiment being described the flange connector 61 comprises a plurality of bolts passing through the first flange 60a of the first flange connection 60 and into a second opposing flange 60b provided on the second engine casing portion 10b. In this embodiment, the first flange 60a comprises a plurality of holes therethrough arranged to receive the bolts 61, with corresponding holes provided in the second flange 60b. In alternative embodiments, one or more clamps, clips and/or fasteners may be used in addition to, or instead of, bolts 61. In such embodiments, the first and/or second flange 60a,b may not have holes therethrough. In other embodiments, the bolts may pass through holes provided in a single flange 60a forming the first flange connection 60 into a bulkhead or other structure to which the flange is connected.

The first flange connection 60 is the first flange connection that is downstream of an axial position, $X_2$, defined by the axial midpoint between the mid-span axial location, $X_1$, on the trailing edge of the most downstream low pressure aerofoil of the low pressure compressor 14 (the first compressor 14) and the mid-span axial location, $X_3$, on the leading edge of the most upstream high pressure aerofoil of the high pressure compressor 15 (the second compressor 15). I.e. it is the flange 60 connection closest to that axial midpoint, $X_2$, in a downstream direction (as marked by arrow C in FIGS. 11A and 11B) from the axial midpoint, $X_2$, the axial midpoint being the midpoint between the rear of the forwardmost compressor 14 and the front of the rearmost compressor 15 in the embodiments being described.

The skilled person would appreciate that flange connection arrangements may vary in various embodiments. For example, in some embodiments the first flange connection 60 may be the first flange connection downstream of the first compressor 14, whereas in other embodiments an additional one or more flange connections 63 may be present between the first compressor 14 and the first flange 60 connection, and/or downstream (rearward) of the first flange 60 connection.

In various embodiments, the additional flange connections 63 may be located anywhere along the length of a casing of the (first) low pressure compressor 14. In some embodiments, the additional flange connection 63 is located downstream of the first compressor 14. In some engine designs, for example, presence of a core mount 53b connecting the core 11 to the pylon and torque box may necessitate a joint in the core casing at the start of the torque box support structure (rearward of the first compressor 14). There may be no barrel-shaped casing extending along the length of the first compressor 14 to meet a different compressor casing and/or forward support structure.

In other embodiments, the additional flange connection 63 may be located at a position along the axial length of first compressor 14. In some engine designs, for example, where the only mount(s) provided may be to the nacelle 21 rather than to the core 11, no torque box or torque panel may be provided within the engine core 11—in such embodiments, the casing may extend further forward—for example to half way along the length of the first compressor 14.

In some embodiments, the additional flange connection 63 may not be present. In such an embodiment, the low pressure compressor casing 76a and the intercase 76b may form a single casing rather than being split into separate sections. The low pressure compressor casing 76b then extends up to, and is connected to, the high pressure compressor casing 76c (e.g. via the first flange connection 60).

Figure 11A:
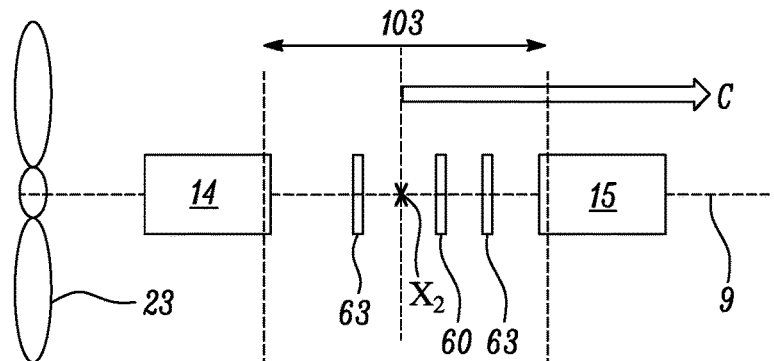
FIG. 11A is a schematic sectional side view illustrating first flange position in one embodiment.

In alternative embodiments, such as that shown in FIG. 11A, the first flange connection 60 is axially upstream of a leading edge of a first (or most upstream) aerofoil of the second compressor 15.

Figure 11B:
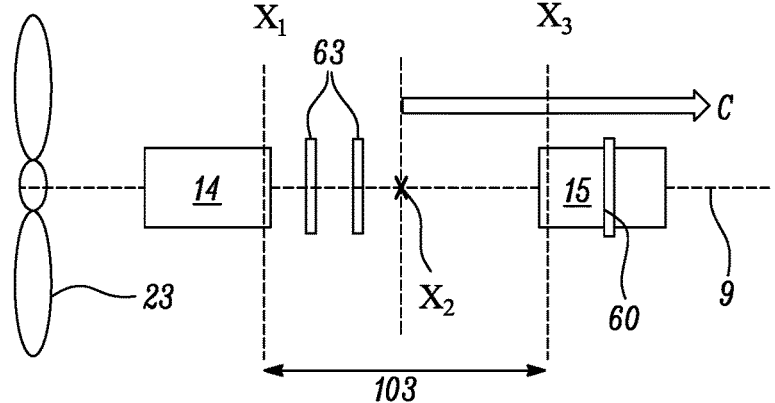
FIG. 11B is a schematic sectional side view illustrating first flange position in another embodiment.

In some embodiments, such as that shown in FIG. 11B, the first flange connection 60 is axially downstream of a leading edge of a first aerofoil of the second compressor 15. In the embodiment of FIG. 11B, the first flange connection 60 has an axial position part way along the second compressor 15. In alternative embodiments, the first flange connection 60 may be axially aligned to the mid-span leading edge of the most upstream high pressure aerofoil of the high pressure compressor 15.

In FIGS. 11A and 11B, the span 103 between $X_1$ and $X_3$ is marked. However, this span only serves to define the axial position $X_2$, and does not limit the position of the flange connection 60—the flange connection 60 may be anywhere downstream of the axial position $X_2$, as illustrated by arrow C.

In the embodiment being described, the intercase 76b comprises two flanges—a forward flange nearer the first compressor 14 and a rearward flange 60a nearer the second compressor 15. The two flanges may each form a part of a different flange connection, and may allow an intercase portion 76b of casing 76 to be lifted away to facilitate access to the compressors 14, 15. In the embodiment being described, the rearward flange 60a of the intercase forms part of the first flange connection 60 (as the forward flange lies forward of the axial midpoint $X_2$). In alternative embodiments, the intercase 76b may be divided into two or more portions, and/or a larger number of flanges may be present—the first flange 60a may therefore not be the rearward, or rearmost, flange of the intercase portion 76b in all embodiments.

In the embodiment illustrated in FIG. 6A the first flange connection 60 is provided in the second outer core casing 80. In this embodiment, the second outer core casing 80 is separated into two portions at the separation point formed by the first flange connection 60. A first flange 60a forming the first flange connection 60 is provided on the downstream of those portions. An opposing second flange 60b is provided on the other portion of the second outer core casing 80 with which the first flange is coupled via the flange connector 61. In other embodiments, any other suitable structure may be provided to provide a connecting point for the flange connector 61.

In the embodiment of FIG. 6B, the first flange connection 60 is provided in the outer core casing 76. In this case, the first and second outer core casings are not provided at the axial position of the first flange connection 60—the outer core casing 76 instead comprises a single wall. In this embodiment, the first flange connection 60 comprises a single flange 60a that is arranged to couple to an adjacent portion of the outer core casing 76, in this embodiment a box-type portion of the outer casing (which may be described as the outer core casing 76 separating into first and second outer core casings over a relatively short axial length of the engine 10). In this embodiment, no second, opposing flange is provided—the flange connector 61 connects the flange 60a of the first flange connection 60 directly to the opposing casing surface.

In the embodiment being described, the opposing casing surface comprises threaded holes arranged to align with threaded holes in the flange 60a; bolts 61 may then be used to join the flange 60 to the opposing casing surface.

First Flange Radius

The first flange radius 104 is the radial distance between the engine centre line 9 and the flange connector 61. In the embodiment being described, the flange connector 61 comprises a plurality of bolts, and the first flange radius 104 is defined as the distance between the engine centreline 9 and a centreline of each bolt (the bolts being oriented axially and located at the same radial distance from the engine centreline 9).

The skilled person would appreciate that the flange connector location (i.e. bolt location in the embodiment being described) affects stress and strain distribution and may therefore be a more relevant parameter than the location of the radially outer edge of the first flange connection 60.

An increase in first flange radius 104 therefore corresponds to moving the first flange connection 60 further from the engine centreline 9, and/or moving the flange connector 61 further up the flange provided in the first flange connection 60 (e.g. by providing bolt holes at a higher radius).

In the embodiments being described, the first flange radius 104 is in the range of 15 cm to 90 cm, and more particularly in the range from 25 cm to 60 cm, for example from 30 cm to 55 cm.

Gas Path Radius and Gas Path Ratio

Figure 7:
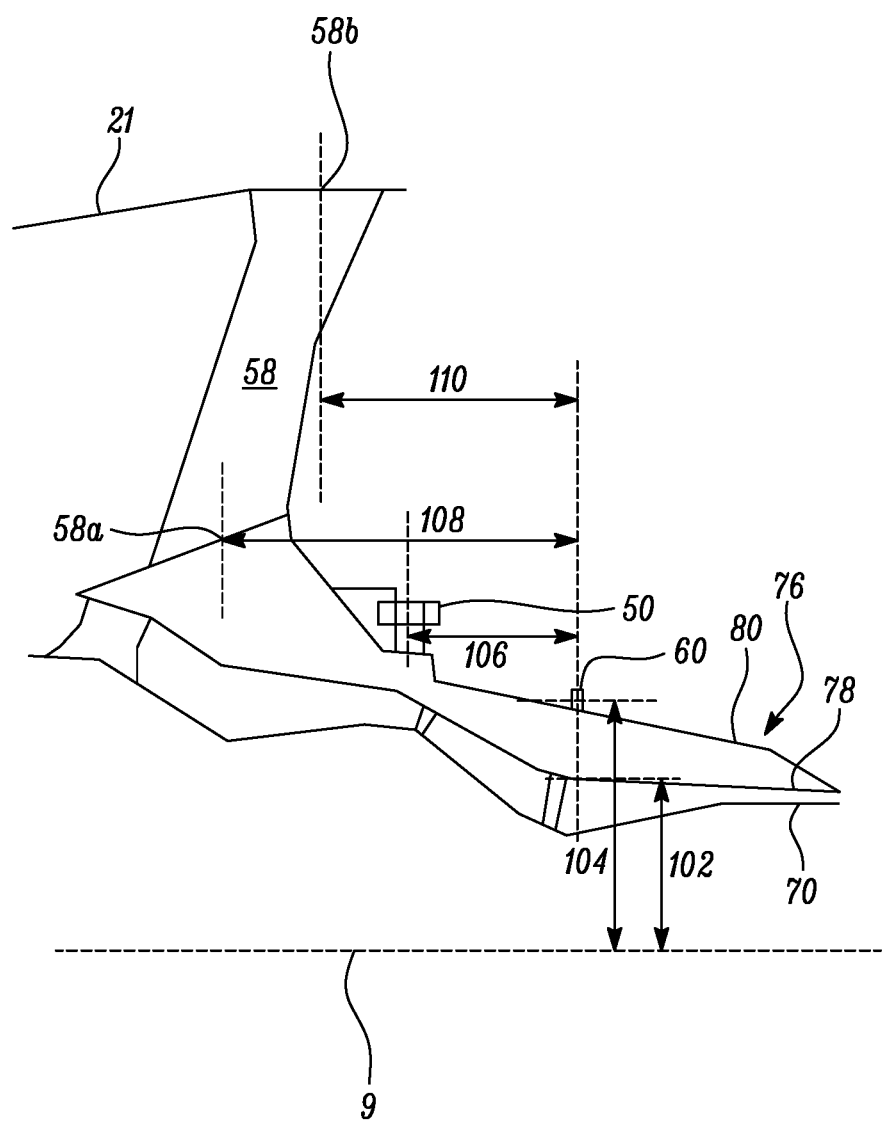
FIG. 7 is a close up sectional side view of a portion of a gas turbine engine behind the fan, with component spacings and radii marked.
Figure 8:
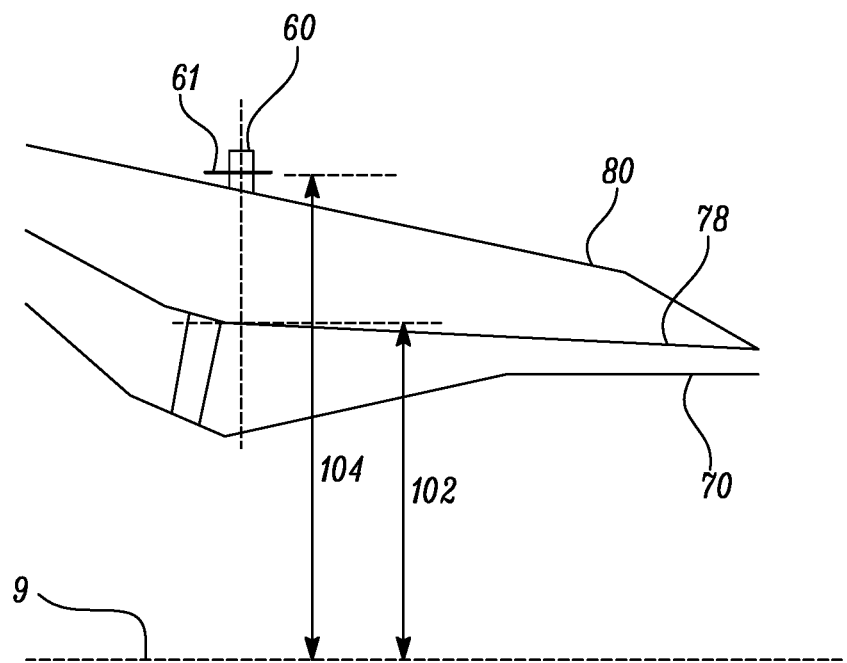
FIG. 8 is an enlarged view of a portion of FIG. 7.

Referring to FIG. 7, a gas path radius 102 is defined as the outer radius of the core gas flow path A at the axial position of the first flange connection 60. The gas path radius is measured in the same plane as the first flange radius 104, and is measured from the engine centreline 9. In the described embodiment, the gas path radius 102 is defined as the radius of the radially inner surface of the first outer core casing 78 which defines the core gas flow path A measured from the engine centreline 9. In other embodiments, the gas path radius may be measured to the radially inner surface of the outer core casing 76 which defines the core has flow path A (e.g. in embodiments where the outer core casing 76 is not bifurcated into the first and second outer core casings 78, 80 at the position of the first flange connection 60).

A gas path ratio is defined as:

$$\frac{\text{first flange radius (104)}}{\text{gas path radius (102)}}$$

In the embodiment being described, the gas turbine engine 10 is configured such that the gas path ratio is equal to or greater than 1.10, and more particularly equal to or greater than 1.50. In both cases, the gas path ratio may be less than 2.0. It may therefore be in an inclusive range between 1.10 and 2.0 or in an inclusive range between 1.50 and 2.0.

The radial positioning of the first flange connection 60 relative to the radius of the gas flow path may contribute to reducing or minimising engine bending whilst maintaining flange integrity. By configuring the gas turbine engine 10 so that the gas path ratio is within the range above the appropriate stiffness may be provided to the engine core 11.

The gas path ratio may be equal to or greater than 1.10 for a medium sized engine (i.e. fan diameter 112 greater than 240 cm). The gas path ratio may be equal to or greater than 1.50 for a large sized engine (i.e. fan diameter 112 greater than 300 cm). These values may however be associated with other fan sizes.

In various embodiments, the gas path ratio may have a value of 1.10, 1.15. 1.20, 1.25, 1.30, 1.35, 1.40, 1.45, 1.50, 1.55, 1.60, 1.65, 1.70, 1.75, 1.80, 1.85, 1.90, 1.95 and 2.00. The gas path ratio may be, for example, between any two of the values in the previous sentence.

Fan Diameter Ratio

As already described elsewhere herein, the gas turbine engine 10 comprises a fan 23 located upstream of the engine core 11. The fan 23 comprises a plurality of rotor blades 23a, also referred to as fan blades 23a, one of which is shown in FIG. 5. The plurality of rotor blades form a rotor blade set in an annular array around a central hub.

A fan diameter ratio is defined as:

$$\frac{\text{first flange radius (104)}}{\text{fan diameter (112)}}$$

In the embodiment being described, the gas turbine engine is configured such that the fan diameter ratio is equal to or greater than 0.125, and more particularly less than or equal to 0.17. It may therefore be in an inclusive range between 0.125 and 0.17.

The fan diameter is equal to twice the radius 101 of the fan 23. In the embodiment being described, the fan diameter is greater than 240 cm, and more particularly greater than 300 cm (in both cases it may be no more than a maximum of 380 cm). In the embodiment being described, the fan diameter is between 330 cm and 380 cm, and more particularly between 335 cm and 360 cm.

The radial positioning of the first flange connection 60 relative to the fan 23 contributes to reducing or minimising engine bending whilst maintaining flange integrity. By configuring the gas turbine engine 10 so that the fan diameter ratio is within the range above the appropriate stiffness may be provided to the engine core 11.

In various embodiments, the fan diameter ratio may have a value of 0.125, 0.130, 0.135, 0.140, 0.145, 0.150, 0.155, 0.160, 0.165 and 0.170. The fan diameter ratio may be, for example, between any two of the values in the previous sentence.

Fan Blade Mass and Blade Set Ratio

A fan blade mass ratio is defined as:

$$\frac{\text{first flange radius (104)}}{\text{mass of each fan blade}}$$

The fan blade mass ratio relates the mass of each fan blade 23a provided on the fan 23 to the first flange radius 104. The skilled person would appreciate that each fan blade 23a generally has the same mass, within manufacturing tolerances. If the mass of each fan blade differs significantly, a fan blade mass ratio for each fan blade may be determined separately and configured to fall within the ranges defined herein. In the embodiments being described, the gas turbine engine 10 is configured such that the fan blade mass ratio is equal to or less than 19.0 mm/pound (41.9 mm/kg). More particularly, the fan blade mass ratio is equal to or greater than 5 mm/pound (11 mm/kg) (or 5.0 mm/pound (11.0 mm/kg)). It may therefore be in an inclusive range between 19.0 mm/pound (41.9 mm/kg) and 5.0 mm/pound (11.0 mm/kg). The mass of each fan blade may be in a range between 20 lb (9 kg) and 70 lb (32 kg).

In various embodiments, fan blade mass ratio may have a value of 5.0 mm/lb (11.0 mm/kg), 6.0 mm/lb (13.2 mm/kg), 7.0 mm/lb (15.4 mm/kg), 8.0 mm/lb (17.6 mm/kg), 9.0 mm/lb (19.8 mm/kg), 10.0 mm/lb (22.1 mm/kg), 11.0 mm/lb (24.3 mm/kg), 12.0 mm/lb (26.5 mm/kg), 13.0 mm/lb (28.7 mm/kg), 14.0 mm/lb (30.9 mm/kg), 15.0 mm/lb (33.1 mm/kg), 16.0 mm/lb (35.3 mm/kg), 17.0 mm/lb (37.5 mm/kg), 18.0 mm/lb (39.7 mm/kg) and 19.0 mm/lb (41.9 mm/kg). The blade set mass ratio may be, for example, between any two of the values in the previous sentence.

The radial positioning of the first flange connection 60 (as determined by the first flange radius 104) and the fan blade mass may also contribute to minimising engine bending whilst maintaining flange integrity. By configuring the gas turbine engine 10 so that the fan blade mass ratio is within the range above the appropriate stiffness may be provided to the engine core 11.

A blade set mass ratio is defined as $$\frac{\text{first flange radius (104)}}{\text{total mass of the plurality of fan blades}}$$

The blade set mass ratio relates the total mass of the plurality of fan blades 23a forming the fan 23 (i.e. the blade set) and the first flange radius (104). In the embodiments being described, the blade set ratio is the inclusive range between 0.95 mm/pound (2.09 mm/kg) and 0.35 mm/pound (0.77 mm/kg).

In various embodiments, the blade set mass ratio may have a value of 0.35 mm/lb (0.77 mm/kg), 0.40 mm/lb (0.88 mm/kg), 0.45 mm/lb (0.99 mm/kg), 0.50 mm/lb (1.10 mm/kg), 0.55 mm/lb (1.21 mm/kg), 0.60 mm/lb (1.32 mm/kg), 0.65 mm/lb (1.43 mm/kg), 0.70 mm/lb (1.54 mm/kg), 0.75 mm/lb (1.65 mm/kg), 0.80 mm/lb (1.76 mm/kg), 0.85 mm/lb (1.87 mm/kg), 0.90 mm/lb (1.98 mm/kg) and 0.95 mm/lb (2.09 mm/kg). The blade set mass ratio may be, for example, between any two of the values in the previous sentence.

As discussed elsewhere herein, each of the fan blades 23a is at least partly formed from a metallic material. The metallic material may be titanium based metal or an aluminium based material such as aluminium lithium alloy.

In other embodiments, each of the fan blades 23a may be at least partly formed from a composite material. The composite material may be, for example, a metal matrix composite and/or an organic matrix composite, such as carbon fibre.

Fan Outlet Guide Vane

A fan outlet guide vane (OGV) 58 is provided that extends radially across the bypass duct 22, between an outer surface of the engine core 11 (e.g. the outer core casing 76) and the inner surface of the nacelle 21.

The fan outlet guide vane 58 connects the engine core 11 to the nacelle 21. The fan OGV 58 may additionally remove or reduce the swirl from the flow coming from the fan 23.

The fan OGV 58 extends between a radially inner edge 58a (adjacent the engine core 11) and a radially outer edge 58b (adjacent the nacelle 21) and has a leading (or upstream) edge and a trailing (or downstream) edge relative to the direction of gas flow B through the bypass duct 22.

An axial position of the radially inner edge 58a of the OGV 58 is defined at the axial mid-point of the radially inner edge 58a. This may be referred to as the inner axial centrepoint of the OGV 58, or the root centrepoint of the OGV 58.

An axial position of the radially outer edge 58b of the OGV 58 is defined at the axial mid-point of the radially inner outer edge 58b. This may be referred to as the outer axial centrepoint of the OGV 58, or the tip centrepoint of the OGV 58.

The axial distance 108 between the root centrepoint of the OGV 58a and the first flange connection 60 is defined as the distance along the axis 9 between the axial position of the root centrepoint 58a of the OGV 58 and the axial position of the axial centre point of the first flange connection 60. The axial distance 108 between the root centrepoint of the OGV 58a and the first flange connection 60 is less than or equal to 135 cm, and more particularly in the range of 30 cm to 130 cm in the embodiment being described. More particularly, it may be in the range of 30 cm to 105 cm, more specifically in the range of 50 cm to 105 cm.

The axial distance 110 between the tip centrepoint 58b of the OGV 58 and the first flange connection 60 is defined as the distance along the axis 9 between the axial position of the tip centrepoint of the OGV 58b and the axial position of the axial centre point of the first flange connection 60. The axial distance 110 between the root centrepoint of the OGV 58a and the first flange connection 60 is less than or equal to 90 cm, and more particularly in the range of 20 cm to 90 cm in the embodiment being described. Yet more particularly, it may be in the range of 40 cm to 90 cm.

The axial positioning of the fan outlet guide vanes (fan OGVs) 58 may have an effect in reducing or minimising engine bending whilst maintaining flange integrity.

In particular, the engine 10 may be designed such that the axial distance 108 between the fan OGV root centrepoint 58a and the first flange connection 60 is relatively short. A ratio of the axial distance 108 between the fan OGV root centrepoint 58a and the first flange connection 60 centre to the first flange radius 104 of 2.6 or less may provide an appropriate stiffness for the engine core 11—this ratio may be referred to as a fan OGV root position ratio, and may be represented as:

$$\frac{\text{axial distance (108) between the first flange connection (60) and the fan } OGV \text{ root centrepoint (58}a\text{)}}{\text{first flange radius (104)}}$$

In the embodiment being described, the engine 10 is configured such that the fan OGV root position ratio has a value of less than or equal to 2.6, and more particularly between 2.6 and 0.8 (inclusive).

In various embodiments, the fan OGV root position ratio may have a value of 2.6, 2.5, 2.4, 2.2, 2.0, 1.8, 1.6, 1.5, 1.4, 1.2, 1.0, or 0.8. The fan OGV root position ratio may be, for example, between any two of the values in the previous sentence.

In some embodiments, a fan OGV root position to fan diameter ratio of:

$$\frac{\text{axial distance (108) between the first flange connection (60) and the fan } OGV \text{ root centrepoint (58}a\text{)}}{\text{the fan diameter}}$$

is less than or equal to 0.33. The fan diameter is equal to twice the radius 101 of the fan 23. In the embodiment being described, the fan diameter is greater than 240 cm, and more particularly greater than 300 cm (in both cases it may be no more than a maximum of 380 cm). In the embodiment being described, the fan diameter is between 330 cm and 380 cm, and more particularly between 335 cm and 360 cm.

In the embodiment being described, the engine 10 is configured such that the fan OGV root position to fan diameter ratio is greater than or equal to 0.12.

In various embodiments, the fan OGV root position to fan diameter ratio may have a value of 0.33, 0.32, 0.30, 0.27, 0.25, 0.22, 0.20, 0.17, 0.15, or 0.12. The fan OGV root position to fan diameter ratio may be, for example, between any two of the values in the previous sentence.

In some embodiments, the fan OGV root position to fan diameter ratio may take a value, or fall in a range, as listed above whilst the fan OGV root position ratio may not take a value, or fall in a range, as listed above, or vice versa. In other embodiments, both fan OGV root position ratios may take a value, or fall in a range, as listed above.

Additionally or alternatively, the engine 10 may be designed such that the axial distance 110 between the fan OGV tip centrepoint 58b and the first flange connection 60 is relatively short. A ratio of the axial distance 110 between the fan OGV tip centrepoint 58b and the first flange connection 60 centre to the first flange radius 104 of 1.8 or less may provide an appropriate stiffness for the engine core 11—this ratio may be referred to as a fan OGV tip position ratio, and may be represented as:

$$\frac{\text{axial distance (110) between the first flange connection (60) and the fan } OGV \text{ tip centrepoint (58}b\text{)}}{\text{first flange radius (104)}}$$

In the embodiment being described, the engine 10 is configured such that the fan OGV tip position ratio has a value of less than or equal to 1.8, and more particularly between 1.8 and 0.6 (inclusive).

In various embodiments, the fan OGV tip position ratio may have a value of 1.8, 1.7, 1.6, 1.5, 1.4, 1.3, 1.2, 1.1, 1.0, 0.9, 0.8, 0.7, or 0.6. The fan OGV tip position ratio may be, for example, between any two of the values in the previous sentence.

In some embodiments, a fan OGV tip position to fan diameter ratio of:

$$\frac{\text{axial distance (110) between the first flange connection (60) and the fan } OGV \text{ tip centrepoint (58}a\text{)}}{\text{the fan diameter}}$$

is less than or equal to 0.22. The fan diameter is equal to twice the radius 101 of the fan 23. In the embodiment being described, the fan diameter is greater than 240 cm, and more particularly greater than 300 cm (in both cases it may be no more than a maximum of 380 cm). In the embodiment being described, the fan diameter is between 330 cm and 380 cm, and more particularly between 335 cm and 360 cm.

In the embodiment being described, the engine 10 is configured such that the fan OGV tip position to fan diameter ratio is greater than or equal to 0.095.

In various embodiments, the fan OGV tip position to fan diameter ratio may have a value of 0.22, 0.21, 0.20, 0.19, 0.18, 0.17, 0.16, 0.15, 0.14, 0.13, 0.12, 0.11, 0.10 or 0.095. The fan OGV tip position to fan diameter ratio may be, for example, between any two of the values in the previous sentence.

In some embodiments, the fan OGV tip position to fan diameter ratio may take a value, or fall in a range, as listed above whilst the fan OGV tip position ratio may not take a value, or fall in a range, as listed above, or vice versa. In other embodiments, both fan OGV tip position ratios may take a value, or fall in a range, as listed above.

Front Mount

The engine 10 is arranged to be mounted to a wing 52 of an aircraft 90 by means of one or more pylons 53 (a pylon may also be referred to as an airframe strut).

In the embodiments being described with respect to FIG. 10, the engine 10 is arranged to be connected to a pylon 53 in a minimum of two places. In the embodiment being described, the two places comprise a nacelle mount 53a connecting the nacelle 21 to the pylon 53 and a core mount 53b connecting the core 11 to the pylon 53. The nacelle mount 53a is forward of the core mount 53b in this embodiment. The front mount 50 is therefore the nacelle mount 53a in the embodiment being described.

In the embodiment shown in FIG. 7, the front mount 50 is a core mount, and two core mounts are provided. The front mount 50 is the front core mount 50.

In some embodiments, the front mount 50 may be a nacelle mount 53a and may be located at the axial position of the fan OGV tip centrepoint 58b.

In various embodiments, there may be only one core mount, or there may be multiple core mounts 53b—for example, the pylon 53 may be connected to the core 11 in multiple places, or multiple pylons 53 may each be connected to the core 11.

In various embodiments, there may be only one nacelle mount 53a, or there may be multiple nacelle mounts 53a—for example, the pylon 53 may be connected to the nacelle 21 in multiple places, or multiple pylons 53 may each be connected to the nacelle 21.

The forward-most mount 50, whether it is a nacelle mount 53a or a core mount 53b, is defined as the front mount 50.

The axial distance 106 between the front mount 50 and the first flange connection 60 is defined as the distance along the axis 9 between the axial position of the axial centre point of the front mount 50 and the axial position of the axial centre point of the first flange connection 60.

The skilled person would appreciate that the axial positioning of the front mount 50 may be important for reducing or minimising engine bending whilst maintaining flange integrity. In particular, the engine 10 may be designed such that the axial distance 106 between the front mount 50 and the first flange connection 60 is relatively short to increase stiffness (in particular increasing intercase stiffness). Keeping the distance 106 relatively short may also improve ease of assembly and core inspection. In the embodiments being described the first flange connection 60 is located at a point where the bending moment on the engine core 11 is quite high. The skilled person would appreciate that bending moment is generally higher nearer to the front mount 50. Increasing the first flange radius 104, so providing a larger diameter for the first flange connection 60, may facilitate reacting the relatively high bending moment.

A ratio of the axial distance 106 between the front mount 50 and the first flange connection 60 centre to the first flange radius of 1.18 or less may provide an appropriate stiffness for the engine core 11—this ratio may be referred to as a front mount position ratio, and may be represented as:

$$\frac{\text{axial distance (106) between the first flange connection (60) and the front mount (50)}}{\text{first flange radius} (104)}$$

In the embodiment being described, the engine 10 is configured such that the front mount position ratio has a value of less than or equal to 1.18, and more particularly between 1.18 and 0.65.

In various embodiments, the front mount position ratio may have a value of 1.18, 1.14, 1.10, 1.05, 1.00, 0.95, 0.90, 0.85, 0.80, 0.75, 0.70, 0.67, or 0.65. The front mount position ratio may be, for example, between any two of the values in the previous sentence.

The axial distance 106 between the first flange connection 60 and the front mount 50 is between 30 cm and 75 cm in the embodiment being described, and more particularly around 30 cm.

In some embodiments, a front mount position to fan diameter ratio of:

$$\frac{\text{the axial distance (106) between the first flange connection (60) and the front mount (50)}}{\text{the fan diameter} (112)}$$

is less than or equal to 0.145. The fan diameter 112 is equal to twice the radius 101 of the fan 23. In the embodiment being described, the fan diameter 112 is greater than 240 cm, and more particularly greater than 300 cm (in both cases it may be no more than a maximum of 380 cm). In the embodiment being described, the fan diameter 112 is between 330 cm and 380 cm, and more particularly between 335 cm and 360 cm.

In the embodiment being described, the engine 10 is configured such that the front mount position to fan diameter ratio is greater than or equal to 0.07.

In various embodiments, the front mount position to fan diameter ratio may have a value of 0.145, 0.140, 0.135, 0.130, 0.125, 0.120, 0.115, 0.110, 0.105, 0.100, 0.095, 0.090, 0.085, 0.080, 0.075, or 0.070. The front mount position to fan diameter ratio may be, for example, between any two of the values in the previous sentence.

In some embodiments, the front mount position to fan diameter ratio may take a value, or fall in a range, as listed above whilst the front mount position ratio may not take a value, or fall in a range, as listed above, or vice versa. In other embodiments, both front mount position ratios may take a value, or fall in a range, as listed above.

In the present disclosure, upstream and downstream are with respect to the air flow through the compressor system; and front and rear is with respect to the gas turbine engine, i.e. the fan being in the front and the turbine being in the rear of the engine.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:
1. A gas turbine engine for an aircraft comprising:
an engine core comprising:
a compressor system with compressor blades comprising respective aerofoils, the compressor system comprising a first, lower pressure, compressor, and a second, higher pressure, compressor; and
an outer core casing surrounding the compressor system and comprising a first flange connection arranged to allow separation of the outer core casing at an axial position of the first flange connection, the first flange connection having a first flange radius, wherein the first flange connection is the first flange connection that is downstream of an axial position defined by an axial midpoint between a mid-span axial location on a trailing edge of a most down- stream aerofoil of the first compressor and a midspan axial location on a leading edge of a most upstream aerofoil of the second compressor;

a fan located upstream of the engine core, the fan comprising a plurality of fan blades and having a fan diameter;

a nacelle surrounding the engine core and defining a bypass duct between the engine core and the nacelle; and a fan outlet guide vane (OGV) extending radially across the bypass duct between an outer surface of the engine core and an inner surface of the nacelle, the fan OGV having a radially inner edge and a radially outer edge, wherein an axial midpoint of the radially inner edge is defined as the fan OGV root centrepoint, wherein a fan OGV root position to fan diameter ratio of:

$$\frac{\text{an axial distance between the first flange connection and the fan } OGV \text{ root centrepoint}}{\text{the fan diameter}}$$

is equal to or less than 0.33.

2. The gas turbine engine according to claim 1, wherein the fan OGV root position to fan diameter ratio is greater than or equal to 0.12.

3. The gas turbine engine of claim 1, wherein the fan OGV root position to fan diameter ratio is between 0.15 and 0.30.

4. The gas turbine engine of claim 1, wherein the fan diameter is greater than 240 cm and less than or equal to 380 cm.

5. The gas turbine engine of claim 1, wherein the fan diameter is greater than 300 cm and less than or equal to 380 cm.

6. The gas turbine engine of claim 1, wherein a number of fan blades is between 16 and 22.

7. The gas turbine engine of claim 1, wherein the engine further comprises a gearbox that is configured to receive an input from a core shaft and output drive to the fan so as to drive the fan at a lower rotational speed than the core shaft.

8. The gas turbine engine of claim 7, wherein a gear ratio of the gearbox is between 3.1 and 4.0.

9. The gas turbine engine of claim 1, wherein the first flange connection is at, or axially downstream of, the leading edge of the most upstream aerofoil of the second compressor.

10. The gas turbine engine of claim 1, wherein the first flange connection is at, or axially upstream of, the leading edge of the most upstream aerofoil of the second compressor.

11. The gas turbine engine according to claim 1, wherein a fan diameter ratio of:

$$\frac{\text{the first flange radius}}{\text{the fan diameter}}$$

is equal to or greater than 0.125 and less than or equal to 0.17.

12. The gas turbine engine according to claim 1, wherein an axial midpoint of the radially outer edge is defined as an fan OGV tip centrepoint, and a fan OGV tip position ratio of:

$$\frac{\text{an axial distance between the first flange connection and the fan } OGV \text{ tip centrepoint}}{\text{the first flange radius}}$$

is equal to or less than 1.8.

13. The gas turbine engine of claim 12, wherein the fan OGV tip position ratio is greater than or equal to 0.6.

14. The gas turbine engine according to claim 12, wherein a fan OGV tip position to fan diameter ratio of:

$$\frac{\text{the axial distance between the first flange connection and the fan } OGV \text{ tip centrepoint}}{\text{the fan diameter}}$$

is less than or equal to 0.22.

15. The gas turbine engine according to claim 1, further comprising a front mount arranged to be connected to a pylon, and wherein a front mount position to fan diameter ratio of:

$$\frac{\text{an axial distance between the first flange connection and the front mount}}{\text{the fan diameter}}$$

is less than or equal to 0.145.

16. The gas turbine engine according to claim 1, wherein the engine core further comprises an inner core casing provided radially inwardly of the compressor blades of the compressor system, the inner core casing and the outer core casing defining a core working gas flow path therebetween, wherein a gas path radius is defined as an outer radius of the core working gas flow path at the axial position of the first flange connection, and a gas path ratio of:

$$\frac{\text{the first flange radius}}{\text{the gas path radius}}$$

is equal to or greater than 1.10 and less than or equal to 2.0.

17. The gas turbine engine according to claim 1, wherein a fan blade mass ratio of:

$$\frac{\text{the first flange radius}}{\text{a mass of each fan blade}}$$

is equal to or less than 19.0 mm/lb.

18. The gas turbine engine according to claim 17, wherein the fan blade mass ratio is equal to or greater than 5 mm/lb.

19. The gas turbine engine of claim 17, wherein the mass of each fan blade is in a range between 20 lb and 70 lb.

20. The gas turbine engine of claim 1, wherein a blade set mass ratio of:

$$\frac{\text{the first flange radius}}{\text{a total mass of the plurality of fan blades}}$$

is in the range between 0.95 mm/lb and 0.35 mm/lb.

* * * * *